United States Patent [19]

Leber et al.

[11] Patent Number: 5,429,653
[45] Date of Patent: Jul. 4, 1995

[54] METHOD OF PARTIALLY INTROVERTING A MULTIPLE LAYER TUBE TO FORM AN OPTICAL FIBER PREFORM

[75] Inventors: Helmut Leber, Hanau; Hartwig Schaper, Aschaffenburg; Norbert Treber, Hanau; Gerhart Vilsmeier, Aschaffenburg; Klaus Reimann, Rodenbach, all of Germany

[73] Assignee: Heraeus Quarzglas GmbH, Hanau am Main, Germany

[21] Appl. No.: 961,696

[22] Filed: Jan. 29, 1993

[30] Foreign Application Priority Data

May 31, 1991 [DE] Germany .................. 41 17 816.5

[51] Int. Cl.6 .............. C03B 23/04; C03B 23/11; C03B 23/047
[52] U.S. Cl. .............. 65/385; 65/404; 65/398; 65/102
[58] Field of Search .............. 65/404, 385, 397, 398, 65/421, 419, 428, 3.12, DIG. 9, 102

[56] References Cited

U.S. PATENT DOCUMENTS

| | | | |
|---|---|---|---|
| 3,711,262 | 1/1973 | Keck et al. | 65/3 |
| 4,304,581 | 12/1981 | Saifi | 65/3.12 |
| 5,171,343 | 12/1992 | Leber | 65/2 |

FOREIGN PATENT DOCUMENTS

| | | |
|---|---|---|
| 0100174 | 2/1984 | European Pat. Off. . |
| 0163071 | 7/1990 | European Pat. Off. . |
| 0458017 | 2/1991 | European Pat. Off. . |
| 3206176 | 8/1983 | Germany . |

*Primary Examiner*—Peter Chin
*Assistant Examiner*—John Hoffmann
*Attorney, Agent, or Firm*—Finnegan, Henderson, Farabow, Garrett & Dunner

[57] ABSTRACT

Starting from a process for producing a rod-like preform, in particular for optical fibers, in which a tubular blank whose refractive index changes, viewed in the radial direction is fed to a heating zone, is softened there, and in the softened state is shaped to give the preform, a method is described for producing preforms which are hyperpure and low in defects, in which the blank used is one whose refractive index decreases, viewed in the radial direction, from the outside inwards, starting from at least one interface which is at a sufficient distance from the outer surface of the blank, of which that part which has been softened in the heating zone is introverted apart from an outer skin, and by which the preform is formed in the longitudinal axis of the tubular blank, counter to the direction in which the latter is fed to the heating zone, and in which the remaining outer skin is drawn off as a rod in the feed direction of the blank.

8 Claims, 1 Drawing Sheet

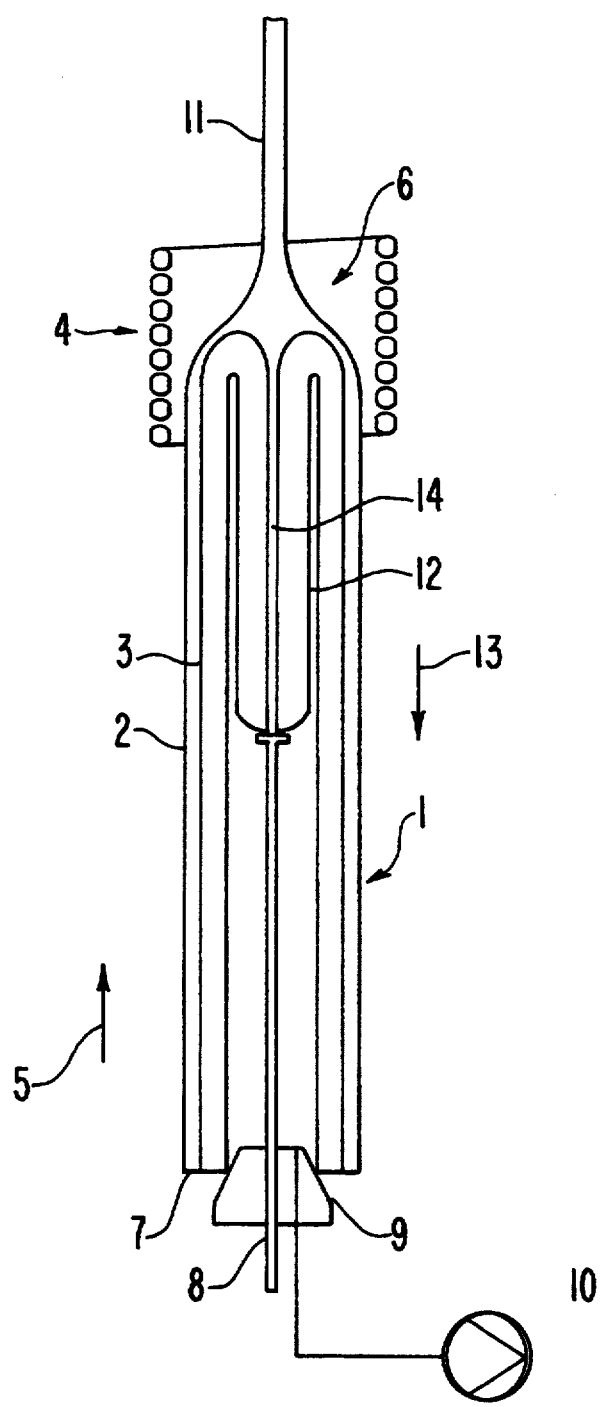

METHOD OF PARTIALLY INTROVERTING A MULTIPLE LAYER TUBE TO FORM AN OPTICAL FIBER PREFORM

This application is a continuation of PCT International Application PCT/EP92/00938, filed Apr. 30, 1992.

FIELD OF THE INVENTION

The invention relates to a method for producing a preform for optical elements, in particular for optical fibers, in which a tubular blank whose refractive index changes, viewed in the radial direction is fed to a heating zone, is softened there, and in the softened state is shaped to give the preform.

DESCRIPTION OF RELATED ART

Preforms for optical elements, in particular for optical fibers, generally have a refractive index profile, viewed in the radial direction, such that a core region having a high refractive index is enveloped by at least one cladding region having a refractive index lower than that of the core region. Because of this refractive index profile, light rays impinging axially on the core region at certain acceptance angles are always redeflected in the cladding region in the direction of the core region, and are thus guided within the preform or within an optical fiber produced from the preform.

For special applications, for example for the transmission of high luminous fluxes, the light-guiding core region of an optical element has a relatively large diameter compared with the wall thickness of the cladding region. In general however, in particular for signal transmission in optical communications or sensor applications, optical fibers are used which, compared with their cladding thickness, have a relatively thin core region.

The blanks for such preforms are produced, for example, by external deposition of particles on an elongated mandrel, dopants being admixed with the deposited particles according to the desired radial refractive index profile of the preform. In the case of preforms for optical fibers with thin cores, such as, for example, monomodal fibers of quartz glass for signal transmission in optical communications, the thin core glass layer is first deposited, and the thick-walled cladding glass layer is then deposited thereon. In order to ensure bubble-free sintering of the deposited "soot layers", the whole of the cladding glass layer is generally built up layer by layer in intermediate steps and sintered to form a glass. Particularly in the case of thick-walled preforms this is relatively laborious and time consuming. The removal of the mandrel, for example by pulling it out, drilling it out or etching it out, produces faults on the inner surface of the tubular body generated. In order to reduce surface defects, the inner surfaces of the tubular bodies generally undergo elaborate cleaning, smoothing and/or drying aftertreatment processes.

The known alternative procedure for producing tubular blanks for preforms, namely the so-called "internal deposition" of core glass layers on the internal surface of a tubular blank, is similarly uneconomical, especially in the case of thick walled tubular blanks, particularly because of the high energy consumption, the poor yield and the low deposition rate.

In the known methods, the tubular blank, in order to collapse it, is heated in a heating zone, starting from one end of the blank and continuing over its whole length, the viscosity of the material of the blank being reduced to such an extent that it collapses into a solid. If optical fibers are being produced, collapsing the tubular blank can be carried out at the same time as the fiber-pulling process step.

In order to avoid inclusions of residual gases when a glass tube is collapsed to produce a preform for optical waveguides, EP-A2 0 163 071 proposes to connect the glass tube to a vacuum pump during the collapsing process, in which process the reduced pressure within the glass tube should be chosen so as to avoid as far as possible any depletion of the dopant in the preform for the optical waveguides.

Vacuum-supported collapsing of a tube can give rise to distortions of the core region of the preform. For example, "Polarization characteristic of non-circular core single-mode fibres, V. Ramaswamy, W. G. French and R. D. Standley, Applied Optics, Vol. 17, No. 18, p. 3014 to 3017" reports that a high vacuum within the tube to be collapsed can give rise to a dumbbell-shaped deformation, and a lower vacuum can produce an oval deformation of the core region of the preform.

EP-A1 100 174 discloses a method for producing an optical glass fiber in which the glass fiber is pulled from a glass tube sealed at both ends, the interior of the glass tube previously having been evacuated to facilitate the collapsing process.

In a method disclosed by U.S. Pat. No. 4,304,581 for collapsing a glass tube having, applied to the inside of the glass tube, a layer containing a readily volatile dopant, the evaporation losses of the dopant during collapsing are reduced by passing through the tube a gaseous halogen compound of that element whose evaporation losses are to be minimized.

The known methods have in common that the total inner surface of the tubular blank is mapped onto the center of the collapsed preform. In addition to the already mentioned problems of bubble formation by gas inclusions and dopant depletion by evaporation of dopant, further problems arise in that faults in the inner surface of the tubular blank, for example because of contamination, humidity or other surface defects, which are in any case inevitable because a surface has a different stoichiometry than a bulk material, lead to inhomogeneities in the center of the preform. There they are usually particularly troublesome.

SUMMARY OF THE INVENTION

The object of the invention is to provide a cost effective method for producing preforms, which are hyperpure and low in defects, for optical elements, in particular for optical fibers.

This object is achieved according to the invention in that the blank used is one whose refractive index decreases, viewed in the radial direction, from the outside inwards, starting from at least one interface which is at a sufficient distance from the outer surface of the blank, in that that part of the blank which has been softened in the heating zone is introverted apart from an outer skin, and the preform is formed in the direction of the longitudinal axis of the tubular blank, counter to the direction in which the latter is fed to the heating zone, and in that the remaining outer skin is drawn off as a rod in the feed direction of the blank.

By causing the softened blank to be introverted, apart from an outer skin, and by forming the preform in the direction of the longitudinal axis of the blank, counter to the direction in which the latter is fed to the heating zone, and by drawing off as a rod only the remaining outer skin of the blank in the feed direction of the said blank, separation of the flow of the material forming the blank, which as a blank moves in one direction, into two flows is achieved which move in opposite directions, in such a way that the internal space of the tube collapses and the contaminated regions of the inner and outer surface of the tubular blank form the outer surface of the preform and the outer surface of the outer skin drawn off as a rod, respectively. As a result, neither the preform thus produced nor the rod drawn off as a collapsing outer skin have interior material regions which had previously formed a surface. The material of the surfaces and of the layers close to the surfaces of the tubular blank is also located on the surface of the preform produced therefrom, whence it can easily be removed if required. Cost effective production of the preform is made possible by using as the blank one whose refractive index decreases, viewed in the radial direction from the outside inwards in at least one doping region which is at a sufficient distance from the outer surface of the blank. This makes it possible, using a relatively easily producible base body, for example a thick-walled tube with a homogeneous refractive index distribution over the wall thickness, to apply material layers in a simple manner by external deposition. The layer thickness of the material layers to be applied in this process can be very low, in the extreme case the material to be applied corresponds exactly to the material required for the core region of the preform to be produced and for the outer skin to be drawn off as a rod. The term interface in this context refers to a region from which there is a continuous or a stepwise decrease of the refractive index, viewed in the radial direction, from the outside inwards, this change in the refractive index possibly being caused by a defined change in the material composition or by doping of a base material, which forms the blank, with a dopant which changes the refractive index. In this context, the regions outside the interface may have an arbitrary refractive index profile. The distance between the interface region and the outer surface of the blank is sufficient if the distance between the outer surface of the blank and the interface adjacent to it is at least equal to the thickness of the outer skin. This makes it possible to produce a preform in which there is at least one rotationally symmetric refractive index change across its cross section.

Inverting the softened blank and forming the preform in the direction of the longitudinal axis of the blank prevents the opposite inner wall surfaces of the blank from coming together and any flattening of the core region of the preform being formed resulting therefrom.

A procedure is preferred in which the tubular blank is fed to the heating zone vertically from below. Normally, particularly to achieve high yields, it is desirable for the preform to contain the greater part of the mass of the blank. If the blank is fed vertically into the heating zone, the gravitational forces acting in the collapsing region support the formation of a preform with a large diameter. If necessary, the preform forming more rapidly under the influence of gravity is supported by a support device which is lowered at the desired rate of formation of the preform.

A method has also been found useful in which the internal pressure in the tubular part of the blank is maintained, by continuous evacuation, at a lower level than that of the external pressure acting on the blank. Because of the internally directed forces acting in the collapsing region due to the reduced internal pressure, the formation of the preform is supported in the direction of the longitudinal axis of the blank counter to the direction in which the latter is fed into the heating zone. Depending on the magnitude of the vacuum generated by the reduced internal pressure, and after setting the other process parameters, such as the temperature in the collapsing region, the draw-off rate of the rod and the feed rate of the blank as well as the geometric dimensions of the blank, it is possible for the formation of the preform to be effected solely by the pressure conditions obtaining in the collapsing region.

It has also been found to be advantageous if traction is additionally applied to the preform being formed. For example, it is possible to attach to the end face of the preform being formed a traction device which can be moved in the longitudinal direction of the blank. The rate at which the preform is being formed can thus be controlled.

It has also been found useful to rotate the tubular blank and the rod, which is being formed from the outer skin, during shaping. Any asymmetries, for example within the heating zone, are thus compensated, and the preform being formed is stabilized in the center of the tubular part of the blank.

In producing optical preforms it has been found to be advantageous, for the method according to the invention, to use tubular blanks, which, apart from dopants which change the refractive index, primarily comprise $SiO_2$, and in particular blanks which contain germanium and/or fluorine.

A procedure is preferred in which layered tubular blanks are used which, viewed in the radial direction, comprise from the outside inwards a layer of undoped $SiO_2$ or a layer of germanium-doped $SiO_2$ and, adjacent thereto and further inwards, a fluorine-doped $SiO_2$ layer. Inverting in the collapsing region reverses the order of the layers, so that in the preform the fluorine-doped layer, which has a lower refractive index than the undoped or the germanium-doped $SiO_2$ layer, is placed further outward in the radial direction and can be used as a cladding glass layer for the light guided in the $SiO_2$ layer.

BRIEF DESCRIPTION OF THE DRAWING

The method according to the invention is described below with reference to the accompanying diagrammatic drawing of apparatus useful in the practice of the invention.

DESCRIPTION OF PREFERRED EMBODIMENT(S)

The reference number 1 designates a quartz glass hollow cylinder having an overall diameter of 130 mm and an internal diameter of 100 mm. On the quartz glass hollow cylinder 1, a 1 mm thick, germanium dioxide-doped quartz glass layer 2 is deposited, at whose interface 3 with the adjacent pure quartz glass layer there is a refractive index step of 0.3%. (The geometry of the hollow cylinder is not shown to scale in the drawing, for reasons of clarity).

The quartz glass hollow cylinder 1 is fed vertically upwards to the heating zone 4 of an induction furnace with a feed rate of 60 mm/min. The feed direction is indicated by the directional arrow 5. Due to the temperature within the heating zone 4 of approximately 2200 degrees Celsius, the quartz glass softens, and as a result the hollow cylinder 1 collapses in a collapsing region 6, where the quartz glass has a mean viscosity of approximately $10^5$ dPas. After the opening of the hollow cylinder, which opening projects into the heating zone 4, has been closed, a pulling rod 8 of quartz glass, which can be moved in the longitudinal direction of the hollow cylinder 1, is introduced from the cold end face of the hollow cylinder 1 through a vacuum-tight passage 9 into the interior of the quartz glass hollow cylinder 1 and is fused to the quartz glass material in the collapsing region 6. By evacuating the hollow cylinder 1 to an internal pressure of 500 mbar by means of a vacuum pump 10 and by pulling on the pulling rod 8 counter to the feed direction 5, and by simultaneously drawing off material from the collapsing region 6 in the feed direction 5, a separation of the material stream, which flows as a hollow cylinder 1 in the direction of the heating zone 4, into two part streams is achieved, of which the one part stream, the outer skin, is drawn off as the rod 11 in the feed direction 5, and the other part stream, is drawn off as the preform 12 in the direction of the axis of the hollow cylinder 1, counter to the feed direction 5.

In the state of equilibrium between the temperature in the collapsing region 6, the feed rate of the hollow cylinder 1 and the draw-off rate of the rod 11, which is also 60 mm/min, under the influence of gravity a preform 12 with a diameter of approximately 80 mm is formed in the direction of the directional arrow 13. The quartz glass rod, which had originally been attached as a pulling rod 8 to that end face of the preform 12 which faced away from the collapsing region 6, in this stage of the procedure serves as a lowerable support device in order to prevent an accelerated rate of descent, due to the increasing mass of the preform 12 being formed, and a resulting change in the diameter of the preform 12. At a rate of lowering of the support device of 60 mm/min, the inversion of the layer order 2, 3 in the collapsing region 6 gives rise to the formation of a germanium-doped core region 14, having a diameter of approximately 6.65 mm, in the center of the preform 12. The remaining germanium-doped material is drawn off as a rod 11 in the draw-off direction 13 in the form of the approximate 22 mm thick rod 11. As a result of the inversion in the collapsing region 6 and the drawing off of the outer skin as the rod 11, all the impurities close to the surface and the defects of the outer surface of the hollow cylinder 1 are mapped onto the outer surface of the rod 11, and all the defects close to the surface and impurities of the inner surface of the hollow cylinder 1 are mapped onto the outer surface of the preform 12, whence they can easily be removed if required. Since, as a result, the core region 14 of the preform 12 is free of layers of material which had at one time formed a surface, the preform 12 is well suited, for reasons which include its geometry as described, for producing monomodal optical fibers.

Having described preferred embodiments of the present invention, it is recognized that modifications and variations thereof falling within the spirit and scope of the invention may become apparent to those skilled in the art, and the scope of the invention is to be determined by the appended claims and their equivalents.

What is claimed is:

1. A method of producing a preform for optical elements, which comprises:
    feeding a tubular glass starting body, having a radially varying refractive index and formed of an outer layer of a first material on an inner layer of a second material, in a first direction into a heating zone where it is heated to a temperature sufficient to soften the starting body;
    introverting the softened starting body to form a preform for optical elements consisting of the material which formed the inner layer of the starting body on a portion of the material which formed the outer layer of the starting body;
    withdrawing the preform from the heating zone in a direction counter to said feeding direction of said starting body into the heating zone; and
    withdrawing from the heating zone, in the same direction as said feeding direction, a rod formed of a remaining portion of the material which formed the outer layer of the starting body.

2. The method according to claim 1, wherein the tubular glass starting body is fed vertically from below the heating zone into said heating zone.

3. The method according to claim 1, wherein a vacuum is generated in the interior of the tubular glass starting body, and an inner pressure lower than the external pressure acting on the starting body is maintained in the tubular glass starting body.

4. The method according to claim 1, wherein a pulling force is applied to the preform as it is formed.

5. The method according to claim 1, wherein the tubular glass starting body and the rod are rotated while the introverting step takes place.

6. The method according to claim 1, wherein the tubular glass starting body consists essentially of $SiO_2$ and doping agents which modify its refractive index.

7. The method according to claim 6, wherein the tubular glass starting body contains at least one doping agent selected from the group consisting of germanium and fluorine.

8. The method according to claim 1, wherein the material of the outer layer of the tubular glass starting body is non-doped $SiO_2$ or germanium-doped $SiO_2$, and the material of the inner layer is fluorine-doped $SiO_2$.

* * * * *